United States Patent
Snyder

(10) Patent No.: US 6,671,817 B1
(45) Date of Patent: Dec. 30, 2003

(54) METHOD AND APPARATUS FOR PRODUCING A CLOCK SIGNAL HAVING AN INITIAL STATE AT REFERENCE POINT OF INCOMING SIGNAL THEREAFTER CHANGING STATE AFTER A PREDETERMINED TIME INTERVAL

(75) Inventor: Wayne Snyder, Simi Valley, CA (US)

(73) Assignee: Nortel Networks Limited, Montreal (CA)

(*) Notice: Subject to any disclaimer, the term of this patent is extended or adjusted under 35 U.S.C. 154(b) by 522 days.

(21) Appl. No.: 09/626,998

(22) Filed: Jul. 27, 2000

Related U.S. Application Data

(60) Provisional application No. 60/189,378, filed on Mar. 15, 2000.

(51) Int. Cl.[7] .............................. G06F 1/12; G06F 1/04
(52) U.S. Cl. ..................... 713/401; 713/400; 713/500; 713/502
(58) Field of Search ................................ 713/400, 401, 713/500, 502, 600; 716/6

(56) References Cited

U.S. PATENT DOCUMENTS

| | | | | |
|---|---|---|---|---|
| 5,079,440 A | * | 1/1992 | Roberts et al. | 327/155 |
| 5,359,232 A | * | 10/1994 | Eitrheim et al. | 327/116 |
| 5,854,755 A | * | 12/1998 | Park et al. | 708/103 |
| 5,982,841 A | * | 11/1999 | Terada et al. | 377/20 |
| 6,130,566 A | * | 10/2000 | Yokomizo | 327/175 |

FOREIGN PATENT DOCUMENTS

| | | | |
|---|---|---|---|
| EP | 0570158 A2 | * | 11/1993 |

OTHER PUBLICATIONS

Sodeyman et al., "Implementing C designs in hardware: a full–featured ANSI C to RTL Verilog compiler in action", Verilog HDL Conference and VHDL International Users Forum., 1998. IVC/VIUF. Proceedings., 1998 International.*

* cited by examiner

*Primary Examiner*—Thomas Lee
*Assistant Examiner*—James K. Trujillo
(74) *Attorney, Agent, or Firm*—Bromberg & Sunstein LLP

(57) ABSTRACT

An apparatus and method of producing a clock signal synchronize such signal to a periodic incoming signal. Each period in the incoming signal has a reference point that is utilized to produce the clock signal. To that end, the reference point of a first period of the incoming signal first is detected. The clock signal then is set to a first logic level upon detection of the reference point. Moreover, also upon detection of the reference point, a count is begun for a predetermined time interval. The clock signal is latched to a second logic level upon expiration of a portion of the predetermined time interval. The first logic level is different from the second logic level. After the predetermined time interval has expired, the clock signal is set to the first logic level upon detection of the next reference point.

23 Claims, 5 Drawing Sheets

METHOD AND APPARATUS FOR PRODUCING A CLOCK SIGNAL HAVING AN INITIAL STATE AT REFERENCE POINT OF INCOMING SIGNAL THEREAFTER CHANGING STATE AFTER A PREDETERMINED TIME INTERVAL

PRIORITY

This application claims priority from provisional U.S. patent application serial No. 60/189,378, filed Mar. 15, 2000, entitled, "PHASE LOCKED OSCILLATOR" and bearing the disclosure of which is incorporated herein, in its entirety, by reference.

FIELD OF THE INVENTION

The invention generally relates to electronic signal synchronization and, more particularly, producing a timing signal for use by a device for clocking at least one process executed by the device.

BACKGROUND OF THE INVENTION

Network devices commonly communicate by synchronizing their inter-device data transmissions to a widely recognized standard clock signal known as the "stratum clock." As known by those skilled in the art, the stratum clock is a precise clock signal that is a multiple of eight kilohertz. Accordingly, it is important for such network devices to be synchronized to the stratum clock when transmitting data to other such network devices. Specifically, among other reasons, transmitted data can be lost and/or corrupted if such network devices receive data that is not synchronized to the stratum clock.

To synchronize with the stratum clock, network devices first typically derive an internal clock signal that is synchronized to the stratum clock. Such internal clock signal generally is synchronized to an incoming signal from another network device that also is synchronized to the stratum clock. Once generated, the internal signal typically may be utilized to clock data that is to be transmitted across a network to another similarly synchronized network device. For example, the internal signal may be scaled, but still synchronized with the stratum clock, to facilitate processes that generate data transmissions to another similarly synchronized network device.

The internal signal may be derived by a number of methods. For example, one commonly utilized method first determines the actual frequency of the incoming signal, and then utilizes divide down hardware and/or software to obtain a specific timing signal (e.g., an eight kilohertz signal). Undesirably, in addition to the divide down hardware and/or software, the hardware and/or software for determining the actual frequency requires a relatively significant overhead cost.

SUMMARY OF THE INVENTION

In accordance with one aspect of the invention, an apparatus and method of producing a clock signal synchronize such signal to a periodic incoming signal. Each period in the incoming signal has a reference point that is utilized to produce the clock signal. To that end, the reference point of a first period of the incoming signal first is detected. The clock signal then is set to a first logic level upon detection of the reference point. Moreover, also upon detection of the reference point, a count is begun for a predetermined time interval. The clock signal is latched to a second logic level upon expiration of a portion of the predetermined time interval. The first logic level is different from the second logic level.

In illustrative embodiments, the reference point of a second period is detected, and the clock signal then substantially immediately is set to the first logic level. The first and second periods may be consecutive, or separated by one or more periods. The count then is begun again for the predetermined time interval again upon detection of the reference point of the second period. The clock signal subsequently is latched to the second logic level upon expiration of about half of the predetermined time interval.

The clock signal may be multiplied by a scalar to conform with an internal oscillator. In addition, the reference point may be a transition from the second logic level to the first logic level. In some embodiments, the clock signal is utilized by a first network device for clocking one of its internal processes. The first network device also may be coupled with a second network device having a second network device signal for clocking one of its internal processes that receives data transmitted to it from the first network device. The clock signal thus is synchronized with the second network device signal.

The incoming signal may have a frequency that is a first multiple of a given frequency. In addition, the clock signal may have a frequency that is a second multiple of the given frequency. In some embodiments, the predetermined time interval is inversely proportional to the given frequency. In yet other embodiments, the portion of the preselected time interval is about half of the preselected time interval.

In accordance with another aspect of the invention, a signal generator for producing a clock signal that is synchronous with a periodic incoming signal (i.e., the incoming signal noted above) includes a logic element that receives the incoming signal, and a timer that is capable of transmitting an enable signal to the logic element. The logic element has an output for transmitting the produced clock signal, and an enable input for receiving the enable signal from the timer. When enabled, the logic element is capable of detecting the reference point in each of a set of periods of the incoming signal. The timer is capable of transmitting the enable signal to the logic element once during a preselected time interval after a previous enable signal is set to logical zero. The logic element sets the clock signal to a first logic level each time the reference point is detected (while it is enabled). Conversely, after the clock signal is set to the first logic level, the logic element sets the clock signal to a second logic level upon expiration of about half of the preselected time interval.

DESCRIPTION OF ILLUSTRATIVE EMBODIMENTS

In illustrative embodiments of the invention, a clock signal that is utilized by a local device for timing data transmission is generated to be synchronous with a clock of a remote device. To that end, the clock signal is generated from an incoming signal (referred to below as an "input signal") that itself is synchronous with the clock of such remote device. Details of the illustrative processes of generating the clock signal are discussed below.

Figure 1:
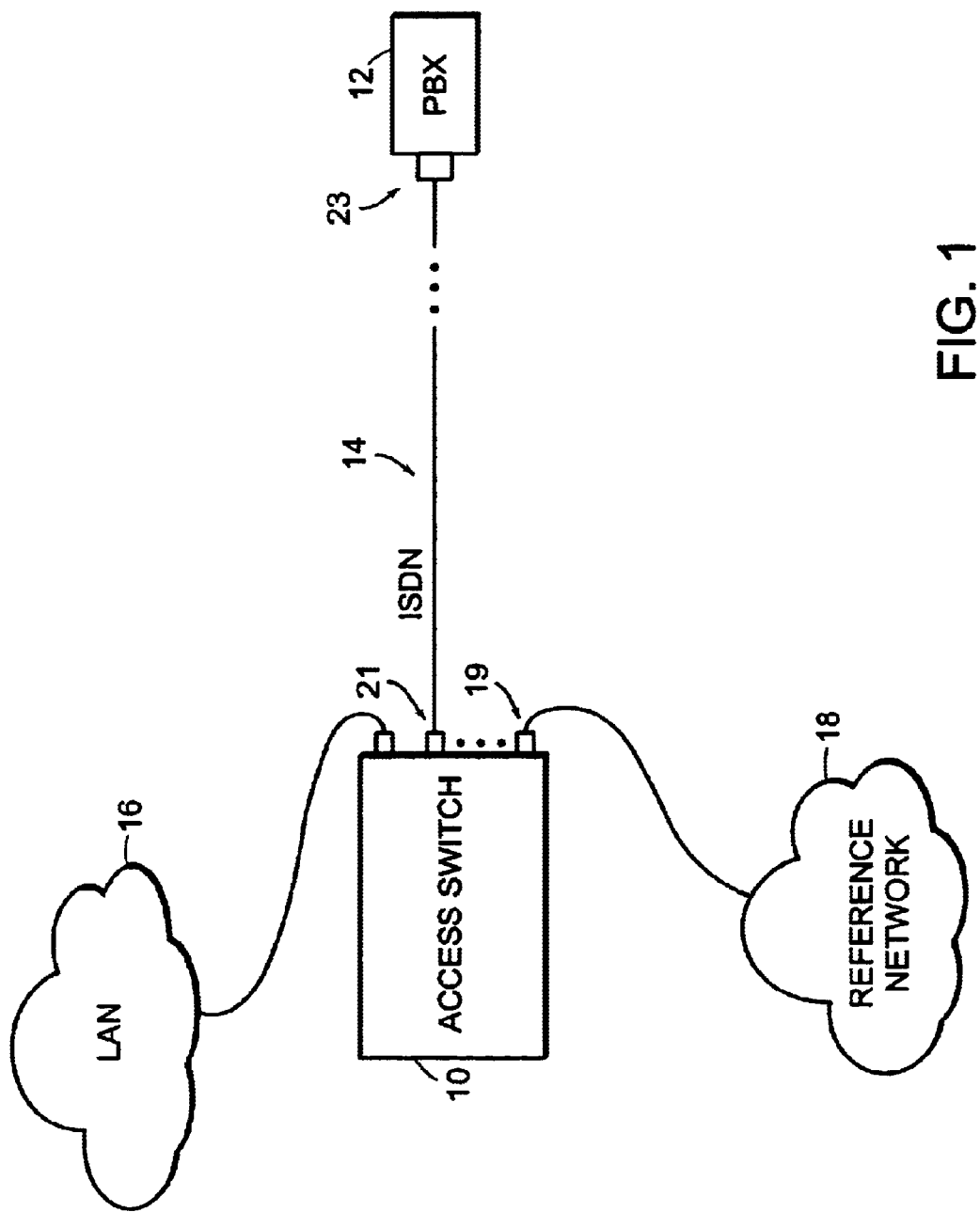
FIG. 1 schematically shows a network arrangement that may be utilized to implement illustrative embodiments.

FIG. 1 schematically shows a network arrangement that may be utilized to implement illustrative embodiments. The network arrangement includes an access switch 10 for providing access to a private branch exchange (i.e., a "PBX 12") via an ISDN (Integrated Services Digital Network) line 14, a local area network ("LAN 16") that utilizes the access switch 10 to access the PBX 12, and a reference network 18 to provide an input signal to the access switch 10. The access switch 10 may be any switch known in the art, such as a PASSPORT™ 4400 series Multiservice Access Switch, distributed by Nortel Networks Corporation of Brampton, Ontario, Canada. In illustrative embodiments, both the input signal and the clock of the relevant port on the PBX 12 (identified by reference number 23) are synchronized with the stratum clock. Moreover, in illustrative embodiments, the actual frequency of the input signal is not known. For example, such signal can be from a Wide Area Network port that is running at a 56K rate.

Among others, the access switch 10 includes an input port 19 that receives the input signal from the reference network 18, and an output port 21 that is coupled with the ISDN line 14. Accordingly, the PBX 12 includes a corresponding PBX port 23 that also is coupled with the ISDN line 14 for sending and receiving transmissions to and from the output port 21 of the access switch 10. As previously noted and discussed in greater detail below, the clock of the output port 21 is synchronized to the input signal received at the input port 19. Since the input signal is synchronized with the clock of the PBX port 23 (i.e., the stratum clock), the output port 21 should be capable of synchronously transmitting and receiving data to and from the PBX port 23 on the PBX 12. Details of the synchronization of the clock of the output port 21 to the stratum clock are discussed below in FIGS. 2–5.

In illustrative embodiments, the clock signal utilized by the output port 21 is generated to be eight kilohertz. Once generated, the clock signal is utilized by baud rate generators (not shown) to generate a synchronous, prescribed baud rate for the output port 21. For example, if the output port 21 utilizes an operating frequency 8.192 megahertz to derive relevant baud rates, then the eight kilohertz signal is multiplied by 1,024,000 to generate a synchronous operating frequency of 8.192 megahertz. Baud rate generators then utilize the resultant synchronous 8.192 megahertz signal to generate the appropriate synchronous baud rates for the output port 21. Simply stated, the baud rate for the output port 21 is generated to be synchronous with the generated eight kilohertz clock signal.

Figure 2:
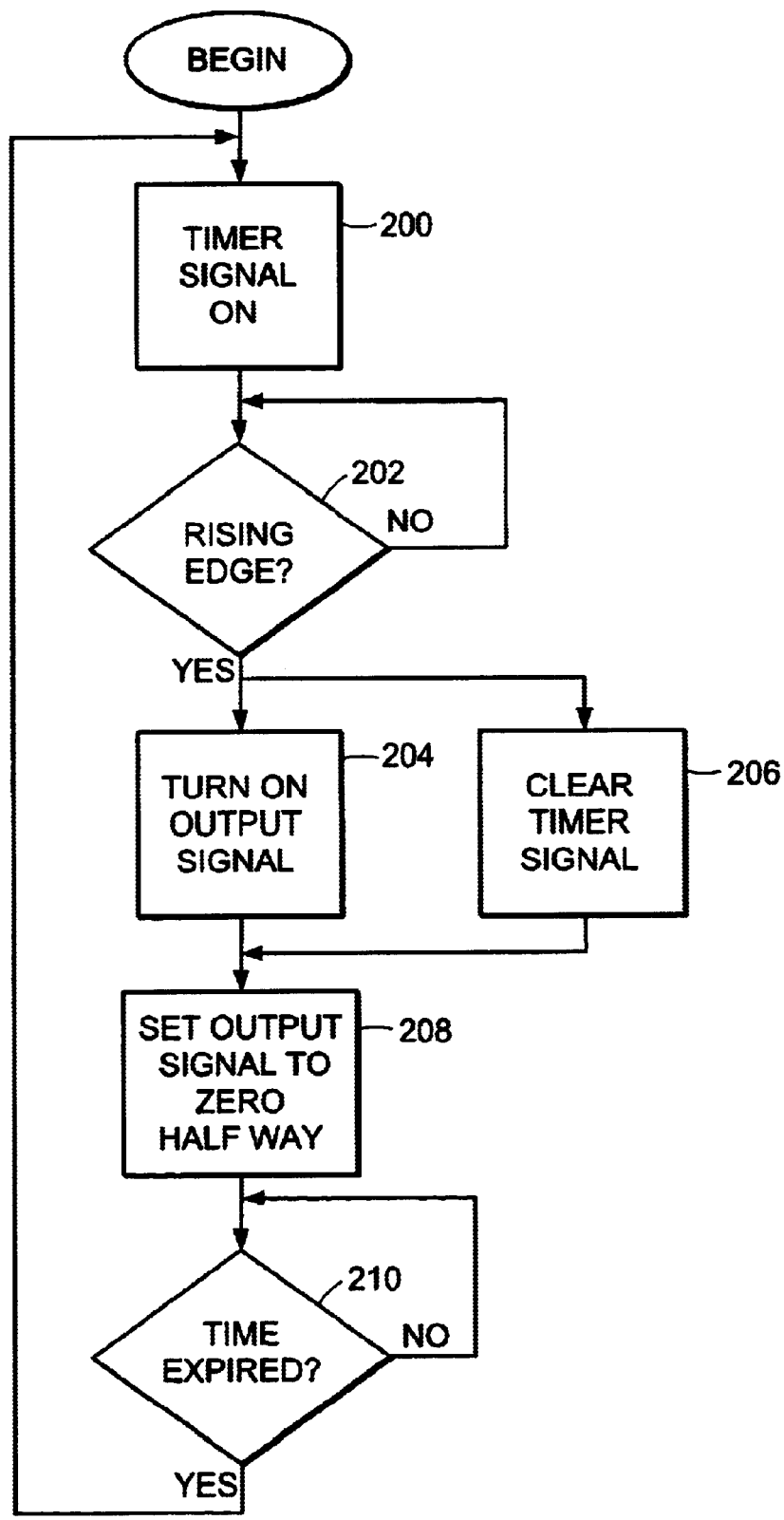
FIG. 2 shows illustrative process of generating a clock signal that is synchronous with an input signal from the reference network shown in FIG. 1.
Figure 3:
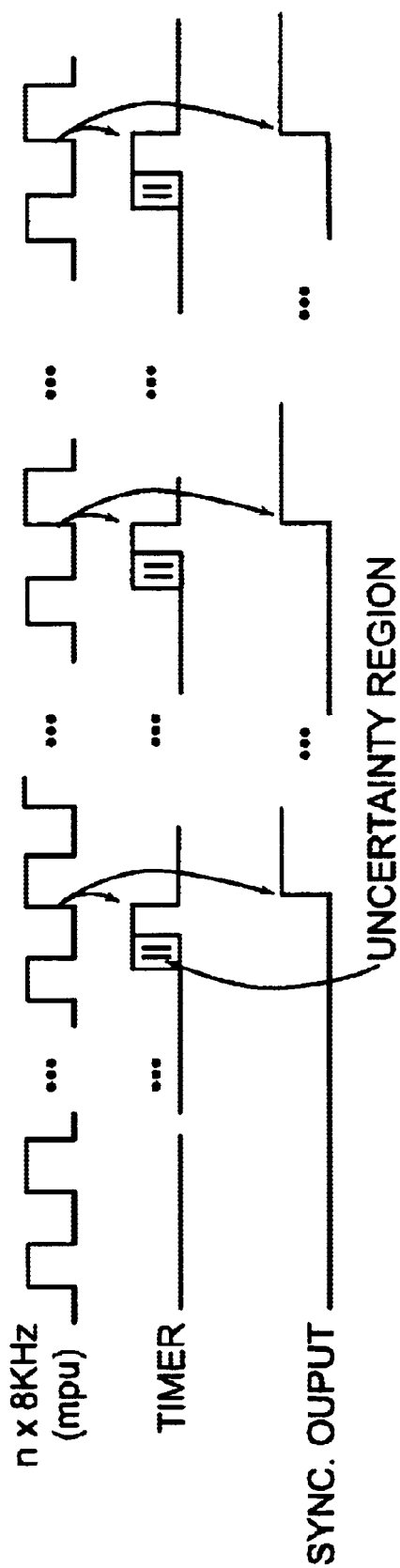
FIG. 3 graphically shows the progression of the process of FIG. 2.

FIG. 2 shows an illustrative process of generating the eight kilohertz clock signal. An exemplary input signal, clock signal, and timer signal each are shown in FIG. 3, which graphically shows progression of the process of FIG. 2. It again should be noted that the input signal is both an unknown multiple of eight kilohertz, and synchronized with the stratum clock. The process begins at step 200, in which a timer signal is turned on at some arbitrary point in time. After the timer signal is turned on, it is determined at step 202 if a rising edge of the input signal is detected. When detected, the process simultaneously continues to step 204, in which the clock signal is turned on (i.e., set to logical one), and to step 206, in which the timer signal is cleared (i.e., set to logical zero) for a predetermined time interval.

The predetermined time interval that the timer signal is cleared is referred to herein as "timer logical zero time." Although shown as being simultaneous, some embodiments may execute steps 204 and 206 serially.

The process then continues to step 208, in which the clock signal is set to logical zero about half way through the timer logical zero time. In embodiments discussed above, the timer logical zero time is set to be just less than about 125 microseconds to ensure that the timer does not overshoot the desired rising edge. The timer logical zero time also is set to be just less than about 125 microseconds to ensure that the clock signal has repeating periods of about 125 milliseconds (i.e., an 8 kilohertz signal). Accordingly, about 62.5 microseconds after the timer is cleared at step 206, the clock signal is set to a low (logical zero) value for the time remaining in the timer logical zero time.

It then is determined at step 210 if time has expired, as defined by the timer signal. Stated another way, it is determined if the timer logical zero time is completed. As noted above, time expires in just less than about 125 microseconds. Accordingly, when time has expired, the process loops back to step 200, thus repeating the process. In addition to producing a signal that is synchronous with the stratum clock, execution of this process shown in FIG. 2 should produce an eight kilohertz clock signal with a duty cycle of about fifty percent.

Figure 4:
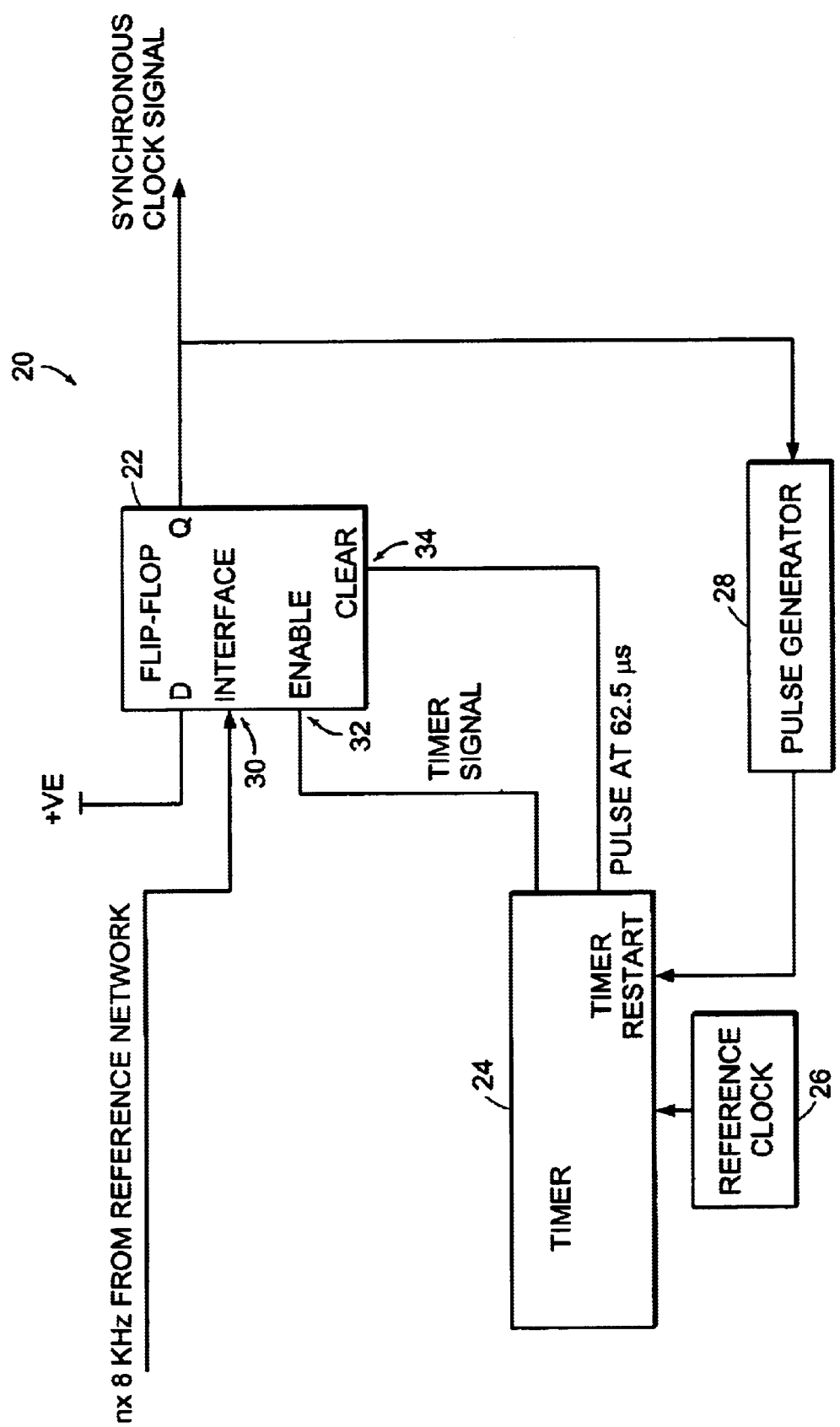
FIG. 4 schematically shows a preferred clock signal generation circuit for implementing the process shown in FIG. 2.

FIG. 4 schematically shows a preferred signal generation circuit (referred to as "circuit 20") for implementing the process shown in FIG. 2. In particular, the circuit 20 includes a flip-flop 22 for generating the clock signal, a timer 24 for generating the timer signal, a reference clock 26 for providing a reference signal to the timer 24 (e.g., an oscillator), and a pulse generator 28 for restarting the timer 24. The flip-flop 22 includes a data input D that normally is set to logical one when the flip-flop 22 is operating, an output Q for producing the clock signal, a input signal interface 30 for receiving the input signal from the reference network 18, and an enable input 32 for receiving the timer signal from the timer 24. In addition, the flip-flop 22 also includes a clear input 34 that is coupled with the timer 24. In the embodiments shown, receipt of a logical one at the clear input 34 causes the flip-flop 22 to clear the output Q. It should be noted that receipt of a logical one at the clear input 34 still clears the output Q even when the flip-flop is not enabled.

The flip-flop 22 operates so that when enabled (i.e., the timer signal is logical one), the state of the input D is latched (i.e., transmitted) to the output Q when a specified change of state of the input signal is detected at the input signal interface 30. In illustrative embodiments, the specified change of state is when the input signal changes from logical zero to a logical one (i.e., when a rising edge is detected). In alternative embodiments, the change of state can be any reference point in various periods of the input signal, such as when the input signal transitions from logical one to logical zero (i.e., when a falling edge is detected).

Accordingly, when the specified change of state is detected and the flip-flop 22 is enabled, the output Q has a value of logical one (i.e., the same value as the input D). The output Q maintains this state until a pulse is detected at the clear input 34, which forces the value of the output Q to be a logical zero.

Figure 5:
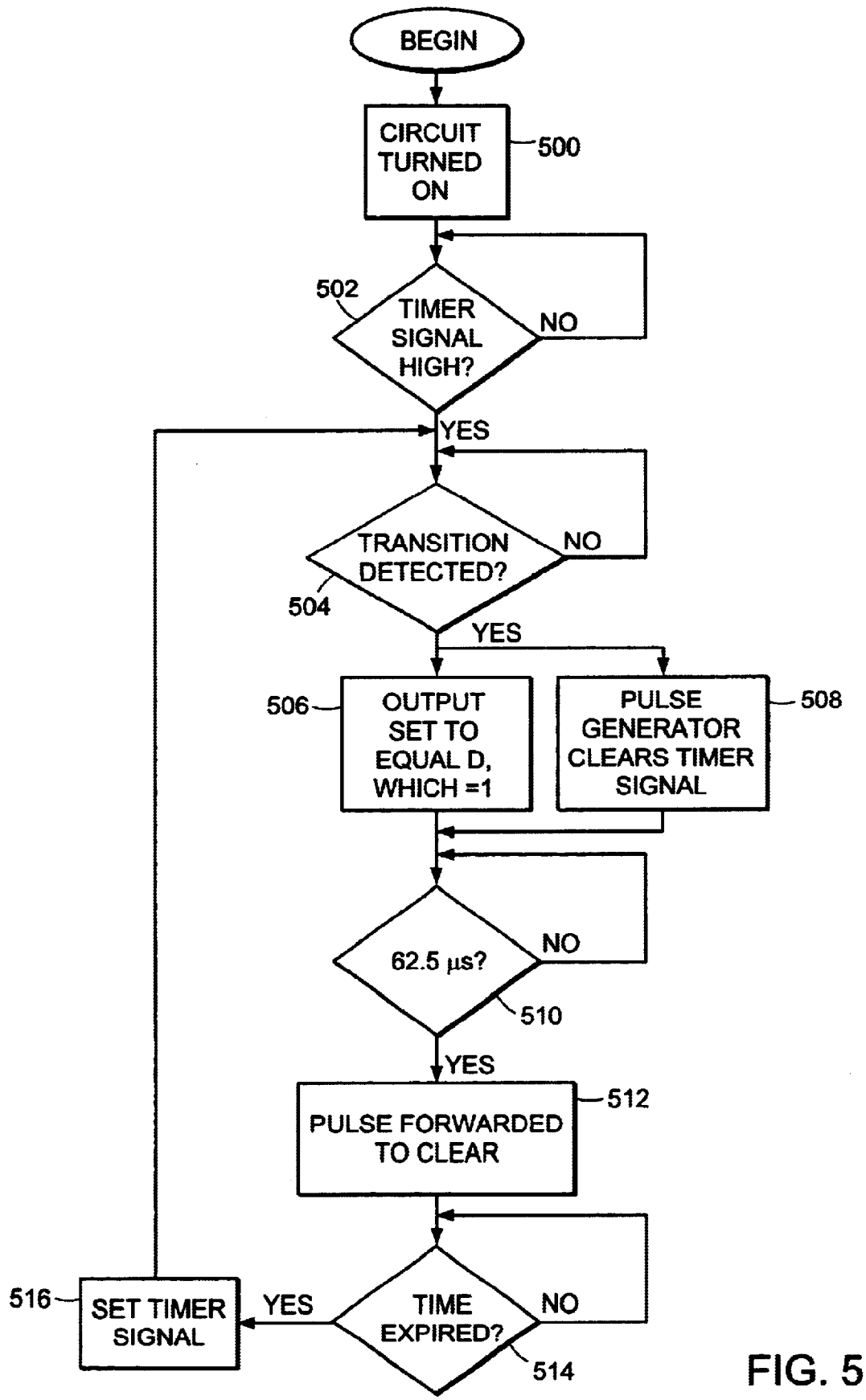
FIG. 5 shows an illustrative process executed by the clock signal generation circuit shown in FIG. 4 for generating a clock signal.

FIG. 5 shows an illustrative process executed by the circuit 20 for generating the clock signal. This process, which implements the process shown in FIG. 2, begins at step 500, in which the elements of the circuit 20 are turned to an "on" state. It then is determined at step 502 if the timer signal at the enable input 32 is high. If high, then the process continues to step 504, in which it is determined if the specified reference point (i.e., transition) is detected. Accordingly, as suggested above, it is determined if the input signal at the input signal interface 30 is detected to have changed from logical zero to logical one.

If the specified transition is detected at step 504, then the process simultaneously continues to step 506, in which the output Q is set to be equal to logical one (i.e., the value at input D), and to step 508, in which the pulse generator 28 clears the timer signal. In preferred embodiments, the pulse generator 28 merely generates a single pulse to a timer restart input in the timer 24 upon detecting that the output Q is at logical one. Receipt of the single pulse causes the timer 24 to set the timer signal to logical zero, and begin counting the specified timer logical zero time of the timer signal. In the illustrative embodiments discussed, the timer logical zero time of the timer signal is specified as follows:

125 microseconds—($\frac{1}{2}$*1/(N*8 Khz)+1/reference clock frequency)

where N equals the maximum multiple of the base frequency that the circuit 20 is specified to process.

In illustrative embodiments, the maximum multiple of the base frequency is 256, which produces a frequency of about 2.048 megahertz. In addition, the reference clock frequency may be about 8.192 megahertz. Accordingly, in such embodiments, the timer logical zero time is calculated to be 125 microseconds—($\frac{1}{2}$*1/(2,048,000)+1/8,192,000), which equals about 124.7 microseconds.

It then is determined at step 510 if 62.5 microseconds have elapsed (i.e., if about half of the logical zero time of the timing signal has elapsed). If such time is determined to have elapsed, then the process continues to step 512, in which a pulse is forwarded from the timer 24 to the clear input 34 to cause the output Q to be at logical zero. In preferred embodiments, this pulse is forwarded substantially immediately upon expiration of the 62.5 microseconds. It then is determined at step 514 if the entire timer logical zero time has expired. Stated another way, it is determined if the time set by the timer 24 (i.e., about 124.7 microseconds) has expired. When expired, the process continues to step 516, in which the timer signal is set to a logical one. Once the timer signal is set to logical one, the process loops back to step 504, thus continuing the process until the clock signal is no longer to be transmitted. Accordingly, this process generates an output signal having repeating periods of about 125 microseconds. Such output signal thus is synchronized with the input signal.

It should be noted that every period in the input signal is not necessarily examined. Accordingly, many periods of the input signal may be skipped during the timer logical zero time. The total number of periods examined in the input signal thus depends upon the frequency of the input signal.

Note that discussion of illustrative embodiments is by example only. Accordingly, discussion of the stratum clock, multiples of eight kilohertz, specifics of the timer logical zero time, and setting the flip-flop 22 to the rising edge are exemplary and thus, are not intended to limit the scope of the invention. For example, the flip-flop 22 can be set to the trailing edge of the input signal, and the input signal can be multiples of any frequency.

In a similar manner, discussion of the network arrangement with the PBX 12, reference network 18, and LAN 16 also are illustrative and thus, also are not intended to limit the scope of the invention. Embodiments of the invention may be utilized in any device that synchronizes a clock signal to an input signal.

Alternative embodiments of the invention may be implemented at least in part in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits, FPGAs, and digital signal processors), or other related components. Other embodiments are implemented in a hardware description language, such as VERILOG or VHDL.

Although various exemplary embodiments of the invention are disclosed below, it should be apparent to those skilled in the art that various changes and modifications can be made which will achieve some of the advantages of the invention without departing from the true scope of the invention.

I claim:

1. A method of producing a clock signal that is synchronous with an incoming signal, the incoming signal being periodic, each period in the incoming signal having a reference point, the method comprising:

detecting the reference point of a first period of the incoming signal;

setting the clock signal to a first logic level upon detection of the reference point of the first period of the incoming signal in a logic element;

beginning to count in a timer for a predetermined time interval when the clock signal is set to the first logic level; and latching the clock signal to a second logic level upon expiration of a portion of the predetermined time interval by sending a clear signal to the logic element from the timer, the first logic level being different from the second logic level.

2. The method as defined by claim 1 further comprising:

detecting the reference point of a second period of the incoming signal; and setting the clock signal to the first logic level upon detection of the reference point of the second period of the incoming signal.

3. The method as defined by claim 2 wherein the first period and second period are consecutive periods in the incoming signal.

4. The method as defined by claim 2 further comprising:

beginning to count for the predetermined time interval upon detection of the reference point of the second period of the incoming signal; and latching the clock signal to the second logic level upon expiration of about half of the predetermined time interval.

5. The method as defined by claim 1 wherein the portion of the preselected time interval is about half of the preselected time interval.

6. The method as defined by claim 1 wherein the reference point is a transition from the second logic level to the first logic level.

7. The method as defined by claim 1 wherein the clock signal is utilized by a first network device for clocking an internal process of the first network device, the first network device being coupled to a second network device, the second network having a second network device signal for clocking one of its internal processes, the clock signal being synchronized with the second network device signal, the internal process of the first network device transmitting data to the second network device.

8. The method as defined by claim 1 wherein the incoming signal has a frequency that is a first multiple of a given frequency, the clock signal having a frequency that is a second multiple of the given frequency.

9. The method as defined by claim 8 wherein the predetermined time interval is inversely proportional to the given frequency.

10. An apparatus for producing a clock signal that is synchronous with an incoming signal, the incoming signal begin periodic, each period in the incoming signal having a reference point, the apparatus comprising:

a detector for detecting the reference,point of each of a set of a plurality of periods of the incoming signal;

a clock signal module operatively coupled with the detector, the clock signal module setting the clock signal to a first logic level upon detection of the reference point of each of the set of periods;

a counter operatively coupled with the detector, the counter beginning to count for a predetermined time interval when the clock signal is set to a first logic level, for each of the set of periods, the clock signal module latching the clock signal to a second logic level upon expiration of a portion of the predetermined time interval when the counter sends a clear signal to the clock signal module, the first logic level being different from the second logic level.

11. The apparatus as defined by claim 10 wherein the reference point is a transition from the second logic level to the first logic level.

12. The apparatus as defined by claim 10 wherein the portion of the preselected time interval is about half of the preselected time interval.

13. The apparatus as defined by claim 10 wherein the first logic level is logical zero, and the second logic level is logical one.

14. The apparatus as defined by claim 10 wherein the clock signal is utilized by a first network device for clocking an internal process of the first network device, the first network device being coupled to a second network device, the second network having a second network device signal for clocking one of its internal processes, the clock signal being synchronized with the second network device signal, the internal process of the first network device transmitting data to the second network device.

15. The apparatus as defined by claim 10 wherein the incoming signal has a frequency that is a first multiple of a given frequency, the clock signal having a frequency that is a second multiple of the given frequency.

16. The apparatus as defined by claim 15 wherein the predetermined time interval is inversely proportional to the given frequency.

17. The apparatus as defined by claim 10 wherein the clock signal module includes a flip-flop.

18. A signal generator for producing a clock signal that is synchronous with a periodic incoming signal, each period in the incoming signal having a reference point, the signal generator comprising:

a logic element that receives the incoming signal, the logic element having an output for transmitting the produced clock signal, and an enable input for receiving an enable signal and a clear input for receiving a clear signal for clearing the output of the logic element, when enabled, the logic element being capable of detecting the reference point in each of a set of periods of the incoming signal;

a timer operatively coupled with the logic element, the timer capable of transmitting an enable signal to the enable input of the logic element once during a preselected time interval after a previous enable signal is set to logical zero, the timer sending a clear signal to the logical element after expiration of a portion of the preselected time interval;

the logic element setting the clock signal to a first logic level each time the reference point is detected, the timer being restarted based upon the clock signal when the clock signal is set to a first logic level.

19. The signal generator as defined by claim 18 wherein the enable signal is set to logical zero upon detection of the reference point for any one of the set of periods.

20. The signal generator as defined by claim 18 wherein the logic element includes a flip-flop.

21. The signal generator as defined by claim 18 wherein the first logic level is logical one, and the second logic level is logical zero.

22. The signal generator as defined by claim 18 wherein the reference point is a transition from the second logic level to the first logic level.

23. The signal generator as defined by claim 18 wherein the portion of the preselected time interval is about half of the preselected time interval.

* * * * *